(12) United States Patent
Canzanese et al.

(10) Patent No.: US 8,112,636 B1
(45) Date of Patent: Feb. 7, 2012

(54) PROTECTION OF CODE OR DATA FROM EXPOSURE BY USE OF CODE INJECTION SERVICE

(75) Inventors: Raymond J. Canzanese, Chadds Ford, PA (US); John D. Halpin, Delran, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 1127 days.

(21) Appl. No.: 11/935,511

(22) Filed: Nov. 6, 2007

(51) Int. Cl.
*G06F 12/02* (2006.01)
(52) U.S. Cl. ...................................... 713/190; 717/159
(58) Field of Classification Search .................. 713/190; 717/159; 719/312
See application file for complete search history.

(56) References Cited

U.S. PATENT DOCUMENTS

| | | | |
|---|---|---|---|
| 5,841,868 A | 11/1998 | Helbig, Sr. | |
| 6,668,325 B1 * | 12/2003 | Collberg et al. | 713/194 |
| 7,263,722 B1 * | 8/2007 | Luo et al. | 726/26 |
| 2004/0003264 A1 * | 1/2004 | Zeman et al. | 713/190 |
| 2005/0183072 A1 * | 8/2005 | Horning et al. | 717/140 |
| 2005/0204348 A1 * | 9/2005 | Horning et al. | 717/140 |
| 2005/0210275 A1 * | 9/2005 | Homing et al. | 713/190 |
| 2007/0234070 A1 * | 10/2007 | Horning et al. | 713/190 |
| 2008/0229155 A1 * | 9/2008 | Forhan et al. | 714/42 |
| 2008/0263366 A1 * | 10/2008 | G | 713/190 |
| 2008/0276314 A1 * | 11/2008 | Wollnik et al. | 726/22 |
| 2009/0049425 A1 * | 2/2009 | Liepert et al. | 717/110 |
| 2009/0063867 A1 * | 3/2009 | Granados et al. | 713/187 |

FOREIGN PATENT DOCUMENTS

| | | |
|---|---|---|
| WO | 02/052386 A2 | 7/2002 |
| WO | WO 2007091558 A1 * | 8/2007 |

OTHER PUBLICATIONS

Canzanese, R.J.; Oyer, M.; Mancoridis, S.; Kam, M., "A Survey of Reverse Engineering Tools for the 32-Bit Microsoft Windows Environment" (Jan. 2005) [retrieved from http://www.pages.drexel.edu/~rjc35/Papers/resurvey.pdf on May 4, 2011].*

* cited by examiner

*Primary Examiner* — H. S Sough
*Assistant Examiner* — Brian Wathen
(74) *Attorney, Agent, or Firm* — Howard IP Law Group

(57) ABSTRACT

A method for operating a binary executable in which some of the data or code is to be protected includes the step of pruning the binary executable of the code andor data to be protected. Nonfunctional code is substituted for the code pruned from the binary executable, to form a pruned executable which does not contain the code to be protected. The code pruned from the binary executable is loaded into a code injection service or program (CIS). The binary executable is placed in memory as with any application. Invoking the pruned executable alone results in crash. The CIS is made part of the operating system service, and is loaded into RAM when the computer starts. When the pruned executable is invoked, the CIS detects its presence, and as the pruned executable runs, the CIS substitutes the actual data or code into the pruned executable, whereby it operates normally.

8 Claims, 3 Drawing Sheets

PROTECTION OF CODE OR DATA FROM EXPOSURE BY USE OF CODE INJECTION SERVICE

FIELD OF THE INVENTION

This invention relates to protection of software code or data from exposure which might compromise its secrecy, and more particularly to such protection by denuding the underlying binary executable of the code or data to be protected, and placing the removed code or data into a code injection program or service which reinjects the code or data into the executable in RAM.

BACKGROUND OF THE INVENTION

FIG. 1 is a simplified block diagram of a conventional or prior-art computer system 10. In FIG. 1, computer system 10 includes a central processing unit (CPU) 12. CPU 12 is connected to a data entry device 14, which may include a keyboard, mouse or the like. A monitor 16 displays the result of processing, as known in the art. Central Processing Unit 12 is also coupled to a random-access or temporary storage memory (RAM) 18 and to a "permanent" or data storage device 20, which may be flash memory or a hard drive. One or more ancillary information transfer devices, such as a floppy drive or compact disk (CD) drive may be provided. Such ancillary transfer devices are illustrated together as a block 22. The computer 10 of FIG. 1 may also be connected to a communication network, as by means of a modem 24. The ROM 20 of FIG. 1 will ordinarily be loaded with various types of software, including "disk operating" system(s) and user applications, as well as various utilities. A representative software application or binary executable which may be found in ROM 20 is illustrated as a block 40. Software 40 typically includes many "lines" of software instructions or code, illustrated together as 42.

Computer software distributed as binary code to be executed, as in the Microsoft Windows operating system (OS), is inherently vulnerable to reverse engineering. Software engineers have available a variety of tools, such as hex editors, decompilers, disassemblers, debuggers, memory dumpers, and the like, which can aid in the reverse engineering process. Such tools can aid in uncovering and discovering the core functionality of a software system. Reverse engineering when used for compromising intellectual property can be harmful to the owner of the intellectual property, as by reducing or eliminating a competitive advantage.

Protection of software means preventing unauthorized access or copying of portions or all of the software to be protected, and protection against unauthorized modification of code and or data. The technology of software protection may be viewed as being software-based or hardware-based. Software-based software protection schemes involve the alteration or modification of the software in its static state (that is, as manifested on a hard drive or other read-only memory (ROM) medium, such as 20 of FIG. 1. Such alteration may include encryption or compression, and it may also involve addition of anti-tampering code. The result of applying software protection to a static computer program is an altered computer program which is scrambled or otherwise modified in its static state, but which is still capable of running normally if appropriately handled. When any computer program is executed, it is loaded from ROM into random-access memory (RAM), such as RAM 18 of FIG. 1. Thus, when a software-protected program is executed, it may be (a) decrypted andor decompressed, and is then loaded into RAM memory. Once decrypted or decompressed, the program may be (b) checked for the presence of any changes attributable to reverse engineering, (c) changed in RAM memory to complicate analysis of the content, andor (d) checked to determine if monitoring by a debugger is occurring. A disadvantage of software protection of code to be protected is that the code continues to exist within the program in ROM even after the protection is applied, and a software engineer will often know where to look for it. Another disadvantage of software protection is that the original, unaltered program exists in RAM memory space as it executes, and a software engineer knows where to look for it, and may access the original program.

Computers that are used for the processing of sensitive information may have their access restricted by the used of locked rooms, and/or by the use of removable hard drives which are kept in a safe during those times when not in use. The computer protected in this way cannot, or course, be connected to any network, unless the entire network is also within the locked space. This approach uses physical exclusion to protect the data or binary executable.

Another approach to software protection is the hardware method. This method makes use of "external" hardware in addition to the computer and its normal peripherals. The external hardware stores code, data, or encryption/decryption keys, and may even perform some processing. The software to be run communicates explicitly with the external hardware to query for the code, data, or encryption/decryption key, and may also send data to the external hardware for processing. One example of such protection is described in U.S. Pat. No. 5,841,868, issued Nov. 24, 1998 in the name of Helbig, Sr. Another example is application WO02052386 in the name of Gordon Edward LaRose, and entitled Method and System for Software Integrity Using Secure Hardware Assist, published 2002-07-4 by European Patent Office. Such techniques can be effective, but the protection is limited to those computers to which the external hardware is attached. A software engineer will know how to attack the software and hardware in those cases in which there is explicit communication among the elements. The code or data to be protected may eventually find its way to the RAM memory space of the computer, where it will be essentially unprotected.

Improved or alternative methods are desired for the protection of sensitive data or computer code.

SUMMARY OF THE INVENTION

A method according to an aspect of the invention is for running a computer program including a binary executable and also including information to be protected against disclosure. The method includes the separation and removal of the information to be protected from the binary executable, to thereby produce (a) a "pruned" executable which is nonfunctional as to the removed information and (b) a code injection service or program including the information to be protected, where the code injection service or program also includes code for determining that the pruned or nonfunctional executable is in computer random-access or dynamic memory, and for populating the nonfunctional executable in random-access memory with the information to be protected, to thereby regenerate the binary executable in the random access memory. The code injection program, with its information to be protected, is stored in random access memory of an approved computer, whereby the code injection program monitors the random access memory for the presence of the pruned or nonfunctional binary. The nonfunctional executable is loaded into the random access memory of the approved computer, whereupon the code injection program responds and populates the pruned binary executable with the information to be protected. Thus, the nonfunctional executable in random access memory becomes functional as to the populated information and executes.

DESCRIPTION OF THE INVENTION

According to an aspect of the invention, a Middle course between software and hardware protection is adopted, in which a peripheral program is created to separately store and protect the data or code to be protected. The pruned binary executable does not contain the code or data to be protected. The pruned binary executable may have useless code substituted for the code or data that has been removed. Such useless code may be meaningless filler or it may be code with a function similar to, but different than, the code or data to be protected. Thus, instead of the use of hardware or of applying the protective software to the program to be protected, the peripheral program "masquerades" as a part of the operating system and executes with a privilege level commensurate with that of the operating system.

Figure 1:
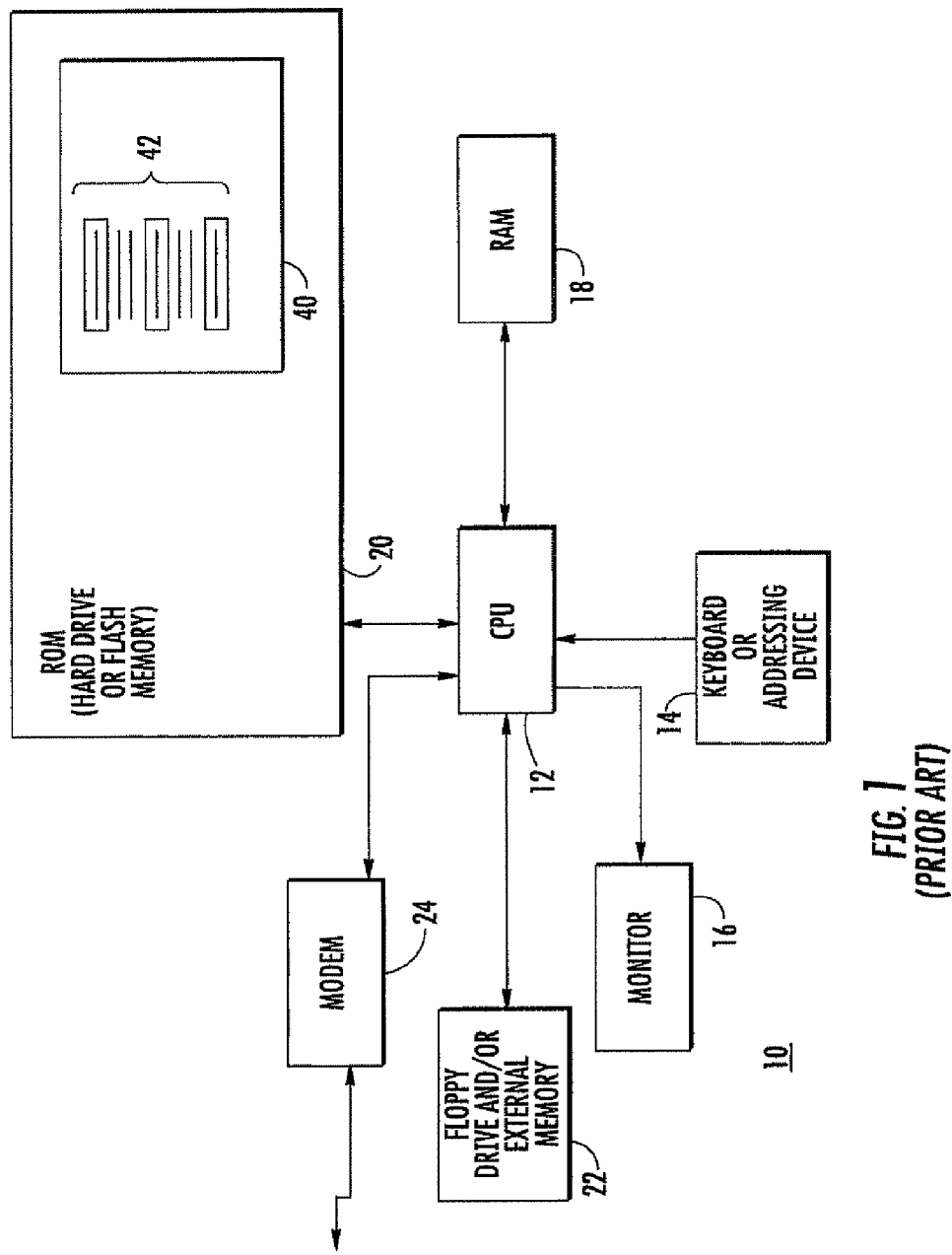
FIG. 1 is a simplified block diagram illustrating a conventional prior-art computer and an associated piece of software including code to be protected.
Figure 2:
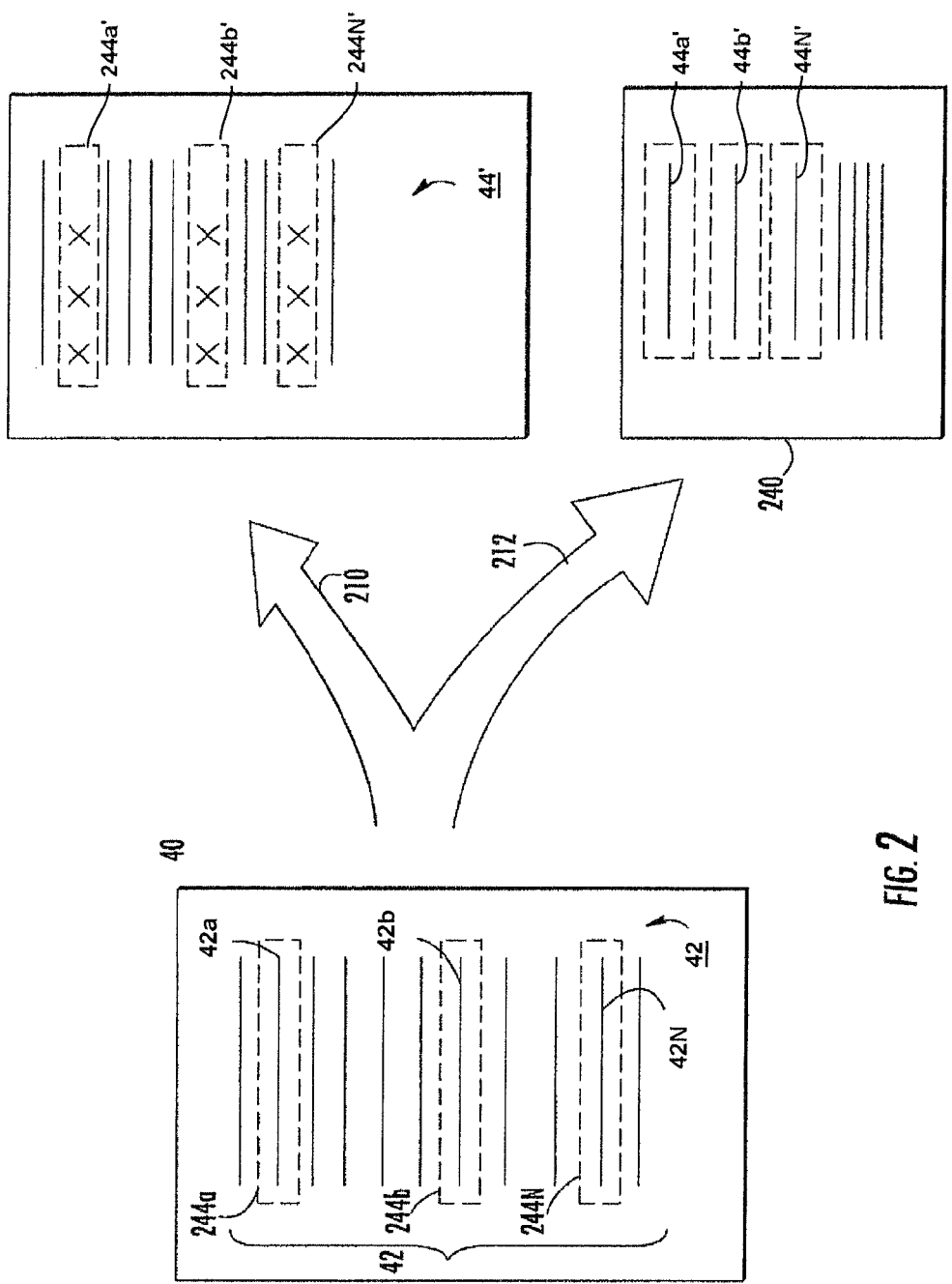
FIG. 2 is a simplified conceptual representation of the separation or removal of the code or data to be protected from a binary executable, and the placement of the code or data so removed into a code injection service or program.

According to an aspect of the invention, the data or code to be protected is removed or taken out of the binary executable to form a pruned binary. This step is illustrated in FIG. 2, in which the original binary executable 40 is illustrated as including a plurality of lines of code 42, some of which, represented by lines 42a, 42b, . . . , 42N of a set 42, are to be protected against undesired copying. Lines 42a, 42b, . . . , 42N are illustrated as being surrounded by dash lines 244a, 244b, . . . , 244N of a set 244 to indicate their status as protectable or to be protected. As suggested by arrow portion 210 of FIG. 2, removal or extraction of the data or code portions 42a, 42b, . . . , 42N to be protected results in the binary partially-executable or non-executable 40', termed a "pruned binary," in which the data or code to be protected is deleted, as suggested by Xs in the outlines 244a', 244b', . . . , 244N' of set 44', leaving a "hole" or "void". The pruned binary executable lacking the data or code to be protected remains in ROM after removal of the data or code to be protected. The data or code to be protected, represented in FIG. 2 by lines 44a', 44b', . . . , 42N', and which was removed from the binary executable 40, is placed in a second or peripheral "code insertion" service program illustrated as 240, as suggested by arrow portion 212 of FIG. 2.

The step of removing the data or code to be protected from the binary executable as described in conjunction with FIG. 2 is performed while the binary executable is in RAM, where it can be manipulated. The manipulation for removal of the data or code to be protected is performed by identifying and removing from the binary executable the code or data to be protected. The process of removing from the executable the code or data to be protected is referred to as "pruning" or the "protection process," and is accomplished either manually or with the aid of an auxiliary tool that is neither the code injection service nor the executable. In order to identify the code and or data of a binary executable to be "pruned" or "protected", both the binary executable itself and its source code (a plaintext representation of the compiled binary executable) for the binary executable are needed. Areas of code to be pruned are first identified in the source code. Once they have been identified in the source code, their corresponding locations in the binary executable are then discovered by one of two methods: (a) either they are located by referring to a mapping file or (b) they are searched for manually. In most cases, mapping files can be output by a compiler, a computer program that converts source code into a binary executable. These mapping files list the sections of the binary executable as they correspond to the sections of the source code. Once the code is located, the code is removed from the binary executable and inserted into a new program, namely the peripheral program or code injection service program, together with information required to identify the removed code and where it belongs in the binary executable. The location at which the code or data is removed from the binary executable may for convenience be termed a "hole" or "void." The void or location from which the code or data is removed, and to which it must be returned during proper execution, is at a location measured by a number termed an "offset," which represents the number of bytes from the beginning of the program at which the data is or was located. At the void at which the code was previously located in the binary executable, the operator or auxiliary tool inserts random data, nonfunctional code, or similar matter. The process is repeated for each code and data section of the binary executable that needs to be protected. The peripheral code injection service program stores the code or data, together with the associated offset information. In addition to the protected code or data and the offset, information about the code immediately prior to and immediately following the pruned location may be stored, to provide a ready basis for identifying the execution of a portion of the pruned binary requiring reinstatement or insertion of the previously pruned code or data. It is also possible to insert additional instructions into the pruned binary adjacent the pruned location, for the same purpose, namely that of identifying where it is "safe" to insert, inject, or overwrite the protected element into the executing pruned binary. The entire protection process as described above is performed prior to the distribution of the binary executable.

When invoked and loaded into. RAM in the absence of the peripheral or code injection service program, the pruned binary executable 40' of FIG. 2 may function much as it did prior to removal of the data or code to be protected, unless it attempts to use the "missing" code or data, in which case the execution will fail, either by crashing or by operating pursuant to the filler code. Operation pursuant to active filler code may make it seem as though the binary executable is operating normally, but it will not be executing according to the missing protected data or code. Thus, the removal of data or code to be protected from the binary executable results in the pruned binary becoming nonexecutable, at least as to the protected portion of the data or code which has been removed. The binary executable may still be executable as to data and code which remain within the binary executable. According to an aspect of the invention, the data or code to be protected, represented by lines 42a, 42b . . . 42N of FIG. 2, is previously placed in the peripheral "code injection" program 240, together with the location offset and possibly other information. The peripheral program is installed on the system at the same level as the operating system services, such that it executes when the system is booted and remains in memory but invisible to the user while the system is on. While in the peripheral program 240 in RAM, the sensitive data or code is protected by the relative invisibility of the peripheral program 240, and may further be protected by traditional software protection techniques such as encryption, anti-debugging, checksumming, or other forms of obfuscation. If obfuscation or encryption is used, the peripheral program decrypyts or decodes the protected code or data in RAM before injecting it into the protected binary executable.

The peripheral program is a separate program, and can be protected with conventional protection techniques without fear of impacting the original function of the pruned binary executable. These techniques include, but are not limited to, encryption, compression, or checksum checking of the code and/or data of the peripheral program and pruned binary executable. Tamper detection may be performed on the peripheral program and/or on the pruned binary by checking for reverse engineering tools.

In operation, the peripheral or code injection program runs or masquerades as operating system level program or service. In the Microsoft Windows operating system, this is the System Service. System Services include special programs that allow a WINDOWS based computer to communicate with a network, log errors, scan for viruses, communicate with hardware, and perform other basic administrative tasks. Other operating systems will have operating system level programs and services, possibly by other names. Users typically have no direct interaction with operating system level programs or services, and their execution is transparent to users. Such programs are loaded into RAM when the operating system starts, and remain in RAM until the computer is shut down.

The code injection program consists of [1] the "pruned" data extracted from the protected executable, together with the offset information and the code or markers used to trigger the injection, and [2] code for monitoring the RAM for the presence of the protected program and the execution thereof. When in RAM, the code injection program monitors the movement of all programs into RAM, waiting for the protected or "pruned program" to be loaded.

When the peripheral or code injection service program is loaded into RAM, it monitors RAM to determine if execution of the binary executable is commanded. When the pruned binary executable is detected in RAM, the peripheral program writes the protected data or code to the binary executable on an as-needed basis, and removes it when no longer needed. More particularly, when the binary executable is loaded into RAM together with the code injection or peripheral program, the code injection program service monitors the pruned binary executable, watching each individual instruction that is executed. When a marker code executes, the code injection program recalls the corresponding protected code and/or data and passes the protected code and/or data to the protected executable in RAM. It does not write protected code or data to ROM. The code injection program inserts or overwrites the code or data so recalled over the filler code. This allows the pruned binary executable to continue functioning as though the protected code or data had been in the void all along.

After the code injection program places protected code and/or data into the "pruned" executable in RAM, the injection program continues to monitor the program, namely the execution of the injected code. When the injected code completes execution, the injection program injects the filler code that was previously in the void back into the protected program, overwriting the protected code, and returning the program to its "pruned" state in RAM. This process repeats as many times as is necessary for each section of pruned code, as long as the program is present in RAM.

A major advantage of this method is that the binary executable never communicates with the peripheral program, so cannot lead a software engineer to the location of the protected data or code. All communications are one-way, originating from the peripheral program, thus obfuscating the source of the data or code appearing in the dynamic or RAM memory. The protected data or code are not stored in the executable binary, but rather reside in the peripheral or code injection program. Since the peripheral program has the same priority as the operating system, its escalated privileges are accompanied by allowing invocation of more detailed system checks and more stringent penalties. In this context, "penalties" refers to various acts invoked when tampering with the program or system is detected. Such penalties may include termination of programs operating on the system. Since the code injection service runs as part of the operating system, is may be able to apply a greater variety of penalties, such as termination of operating services, termination of programs a user is running, logging of the programs and services that are running on the system, shutdown of the system, self-uninstallation or uninstallation of other programs, or the like.

When the executable binary code absent the protected code or data appears in RAM, the code injection program may optionally check to ensure the operating system is safe for injection. These checks can include traditional software protection techniques, such as checksums of the protected program, or checking to see if the program is being analyzed with a debugger. These are widely used software protections.

As an example of the method, assume that a programmer wants to write a program to calculate the fuel efficiency of a vehicle. He wants to protect the algorithm that he uses to calculate the efficiency. During the writing of the program, he writes the following program for calculating the fuel efficiency, where CalculateEfficiency is a function which contains the algorithm to be protected:

```
int CalculateEfficiency( int miles, int gallons)
{
   int Fuelefficiency = 0;
   Fuelefficiency = miles/gallons;
   Printf("Fuel efficiency is %d", fuelefficiency);
   Return Fuelefficiency;
}
int main( )
{
   int m = 124;
   int g = 9;
   CalculateEfficiency (m,g);
   return 0;
}
```

The code for the fuel efficiency is compiled in a usual manner, thereby creating a binary executable. The programmer refers to the mapping file created by the compiler in order to determine where the CalculateEfficiency function is located in the binary executable. The mapping file may, include the following information:

| Address | Function | Size |
| --- | --- | --- |
| 0000010 | main | 50 |
| 0000200 | CalculateEfficiency | 150 |

This file would indicate both the address and length of the function to be protected, (CalculateEfficiency, offset 200, length 150). This indicates that bytes 200 through 350 of the protected application comprise the CalculateEfficiency function. The programmer would remove the data from this range and insert it into the code injection service, including the address and size information. This would essentially involve removal of the following lines of code from the program:

int Fuelefficiency=0;
   Fuelefficiency=miles/gallons;
   Printf("Fuel efficiency is % d", fuelefficiency);
   Return Fuelefficiency;

Where this data used to be, the programmer inserts an array of zeroes, such that the program will do nothing where this calculation used to be. Special instructions are placed before and after the void created by the removed sections that are later used to identify them. These instruction are typically just a series of bytes used to identify the code, and are only executed for identification purposes. They generally have no effect on the overall execution of the program, and are overwritten when the protected code is injected. For example, a software breakpoint instruction (which only has relevance when a program is being analyzed in a debugger) can be used, followed by and identifier tag, an essentially random series of bytes. The identity of the special instructions is also saved to the code injection service or peripheral program as an identifier so that the injection program knows which special instructions correspond to a specific section of pruned code. The filler code is also saved to the peripheral program so that it can be used to overwrite the pruned code when the pruned code is no longer needed.

Figure 3:
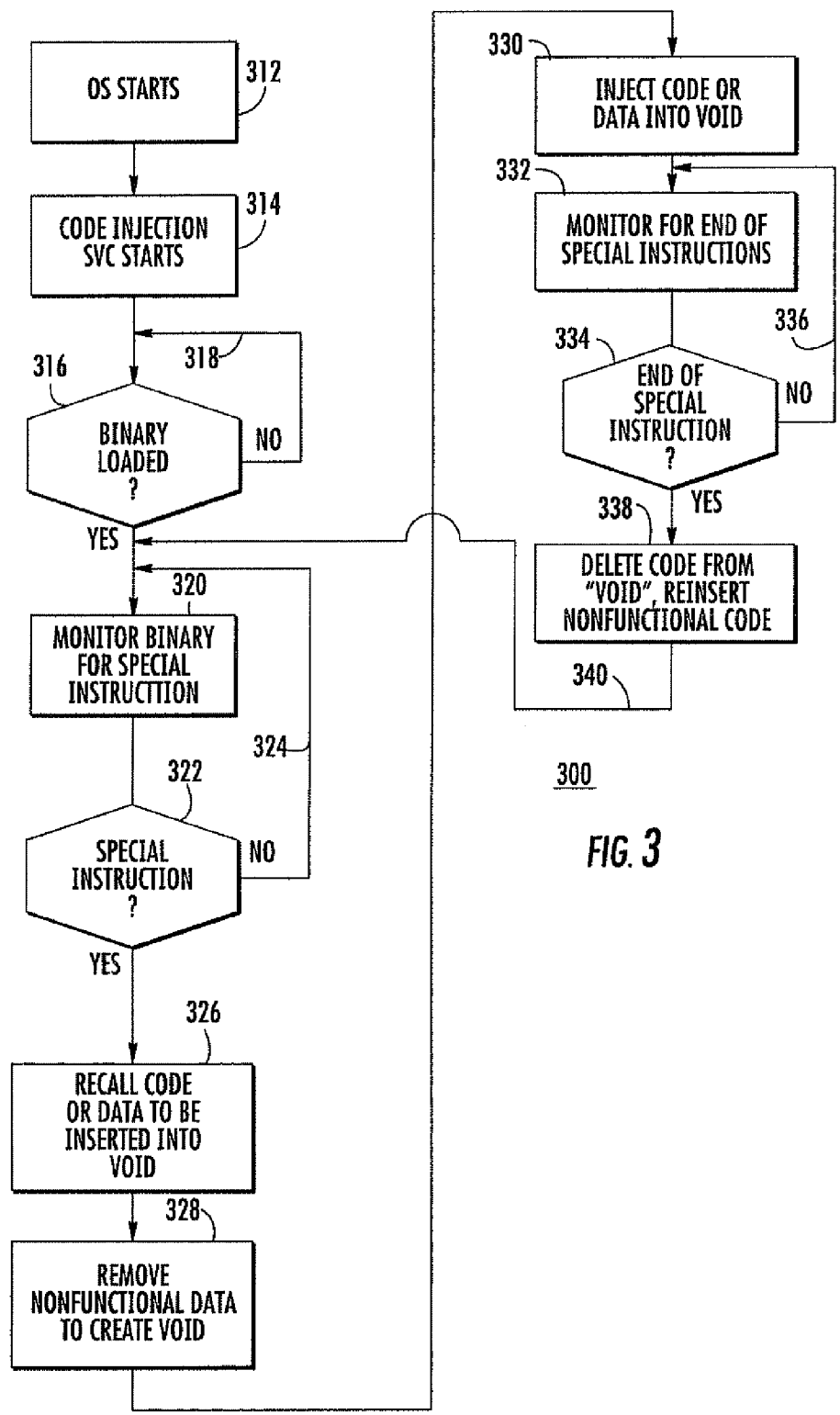
FIG. 3 is a simplified logic flow chart or diagram illustrating the processing associated with the operation of the code injection service or program.

Those skilled in the art will know how to generate the code injection program. FIG. 3 is a simplified flow chart or diagram 300 illustrating the logic. In FIG. 3, the logic begins at an Operating System (OS START) block 312, and proceeds to a block 314, which represents loading of the code injection program into RAM. Decision block 316 represents sitting, awaiting the entry into RAM of the pruned binary. Until the pruned binary is loaded into memory, the logic leaves decision block 316 by the NO output, and returns by way of logic path 318 to the input of decision block 316. When decision block 316 detects the presence of the pruned binary, the logic leaves by way of the YES output, and arrives at a block 320. Block 320, together with decision block 322, represents the monitoring of the pruned binary for arrival at a special instruction operating point or condition at which, in the absence of code injection, it would malfunction. Until a special instruction is detected, the logic leaves decision block 322 by the NO output, and proceeds by a logic path 324 back to block 320. When a special instruction is detected, the logic leaves decision block 322 by the YES output, and flows to a block 326. Block 326 represents recalling from memory that data or code which is to be inserted into the void identified by the current special instruction. Block 328 represents the removal from the pruned binary of any nonfunctional code which might be located in the void region. The nonfunctional code is typically stored in the memory of the code injection service, such that it may be inserted back into the pruned binary and subsequently return the binary to its pruned state. From block 328, the logic of FIG. 3 flows to a block 330. Block 330 represents the injection into the void (whether newly made by deletion of nonfunctional code or originally in the pruned binary) of the active data or code. With the proper code or data in the binary, execution of the binary can continue. As it continues, the code injection service logic flows to a block 332, which together with decision block 334 representing looking for the end of the special instruction. Decision block 334 seeks the end of the special instruction. Until decision block 334 detects the end of the special instruction, the logic of FIG. 3 leaves by way of the NO output, and flows by a path 336 back to block 332. Eventually, the end of the special instruction is detected by decision block 334, and the logic leaves decision block 334 by the YES output. The logic flows to a block 338, which represents deletion of the "correct" code or data from the binary to create a void, and the reinsertion of the nonfunctional code which was removed in block 328. The code injection service logic of FIG. 3 then returns by way of a path 340 to the monitoring function represented by block 320.

After the code or data to be protected is inserted into the peripheral or code injection service program, the peripheral or code injection service program can itself be optionally protected by encryption or other software protection techniques. The encryption makes it safe to store the peripheral or code injection program in ROM. At this point, the computer can be used in the normal manner with other programs, and it is irrelevant if it is turned OFF, as the peripheral program is no longer in RAM, but rather in ROM. Being in ROM, both the peripheral program and the pruned binary executable can be copied to and installed on any other computer, if desired.

The programmer identifies the computer system on which he desires to run the fuel efficiency program, and installs the pruned binary and the peripheral program in the selected computer. When the computer is booted, the peripheral program runs and sits in RAM awaiting the invocation of the pruned binary executable. When the binary executable is run, the peripheral program evaluates the checksums. Assuming that the checksums are correct, at such time as the pruned binary executable is run and reaches the portions of code identifying the start andor end of pruned location, those portions of the peripheral program which include the identification information respond by inserting the pruned information appropriate to the location. In the example, the information is injected when CalculateEfficiency is called from within the main function. Information is then inserted so the binary executable can perform the calculation. Once the calculation is finished, the information is overwritten by the peripheral program. The overwriting may be by a random number, or by the apparently-functional filler information that is saved in the peripheral program. The binary executable program goes on to execute the "return" instruction and exits cleanly.

The function of the binary executable program in the presence of the peripheral program is transparent to the user. The executable started, performed its function, and ended.

If a reverse engineer were to attack the fuel efficiency program, the peripheral program would notice the attack by virtue of the checksum error, and either not load the pruned data, in which case the dummy data would be operated on. As an alternative action, the peripheral program might invoke a penalty or terminate its operation.

What is claimed is:

1. A method for running a computer program including a binary executable containing information to be protected against disclosure, said method comprising the steps of:
   separating said information to be protected from said binary executable, to thereby produce a pruned executable lacking said information to be protected;
   procuring a code injection program including code for determining that the pruned executable is in computer random-access memory and for selectively populating said pruned executable with information stored in said code injection program;
   loading said information to be protected into said code injection program;
   loading said code injection program loaded with said information to be protected onto random access memory of a selected computer, whereby said code injection program monitors said random access memory of said selected computer for the presence of said executable;

loading said pruned executable onto said random access memory of said selected computer, whereupon said code injection program responds and selectively populates said pruned executable with said information to be protected, whereby said random access memory contains said pruned executable with said selectively populated information to be protected and said pruned executable with said selectively populated information to be protected executes.

2. The method according to claim 1, wherein said step of separating said information to be protected from said binary executable includes the step of applying identifying code to each piece of information to be protected for identifying the location into which it should be inserted in the pruned binary executable.

3. A method according to claim 1, wherein said step of lading said pruned executable onto said random access memory of said selected computer, whereupon said code injection program responds and populates said binary executable with said information to be protected comprises the further steps of:

monitoring the operation of said pruned binary executable and, when the operation reaches a point at which information to be protected has been separated from the executing binary executable, reattaching said information to be protected so that said operating binary executable can continue to execute.

4. A method for running a computer program including a binary executable including information therein which is to be protected against disclosure, said method comprising the steps of:

identifying within said binary executable each occurrence of that information which is to be protected;

removing from said binary executable each occurrence of said information which is to be protected, and substituting therefore nonfunctional information, to thereby generated a pruned binary executable;

procuring a code injection program which runs as part of the operating system services, monitors for the presence of said pruned binary executable in random access memory, and reinserts into each occurrence of said nonfunctional information the previously removed information which is to be protected, so that said binary executable can execute.

5. A method for running a computer program including a binary executable containing information to be protected against disclosure, said method comprising the steps of:

separating said information to be protected from said binary executable, to thereby produce a pruned executable lacking said information to be protected;

procuring a code injection program including code for determining that the pruned executable is in a random-access memory and for selectively populating said pruned executable with information stored in said code injection program;

loading said information to be protected into said code injection program;

loading said code injection program loaded with said information to be protected into the random access memory of the selected computer, whereby said code injection program monitors said random access memory of said selected computer for the presence of said pruned executable;

loading said pruned executable into said random access memory of said selected computer, whereupon said code injection program responds and selectively populates said pruned executable with said information to be protected, whereby said random access memory contains said pruned executable with said selectively populated information to be protected and said pruned executable with said selectively populated information to be protected executes.

6. The method according to claim 5, further comprising:

applying protection to said code injection program and said information to be protected on a condition that said code injection program and said information to be protected is loaded into said random access memory.

7. The method according to claim 6, wherein the applying protection is performed by encrypting said code injection program and said information to be protected.

8. The method according to claim 6, wherein the applying protection is performed by compressing said code injection program and said information to be protected.

* * * * *